United States Patent
Patino et al.

(10) Patent No.: US 7,260,420 B2
(45) Date of Patent: Aug. 21, 2007

(54) APPARATUS AND METHOD FOR STIMULATING ONE OR MORE AREAS ON A WEARER

(75) Inventors: Joseph Patino, Pembroke Pines, FL (US); Jose E. Korneluk, Boynton Beach, FL (US); James L. Tracy, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 385 days.

(21) Appl. No.: 10/965,052

(22) Filed: Oct. 14, 2004

(65) Prior Publication Data

US 2006/0084480 A1 Apr. 20, 2006

(51) Int. Cl.
*H04B 1/38* (2006.01)
*H04M 1/00* (2006.01)

(52) U.S. Cl. .................. 455/567; 455/569.1; 455/461; 455/426.1; 455/412.2; 455/414.1; 340/574; 340/7.53; 340/573.4

(58) Field of Classification Search ................ 455/567, 455/461, 412.2, 414.1, 426.1, 445
See application file for complete search history.

(56) References Cited

U.S. PATENT DOCUMENTS

| | | | |
|---|---|---|---|
| 5,584,070 A * | 12/1996 | Harris et al. ............... 340/7.54 |
| 5,903,845 A * | 5/1999 | Buhrmann et al. .......... 455/461 |
| 5,917,415 A * | 6/1999 | Atlas .......................... 340/575 |
| 5,933,778 A * | 8/1999 | Buhrmann et al. .......... 455/461 |
| 5,954,793 A * | 9/1999 | Stutman et al. ............. 709/204 |
| 5,956,626 A * | 9/1999 | Kaschke et al. ............ 455/115.1 |
| 6,087,942 A | 7/2000 | Sleichter, III et al. |
| 6,177,905 B1* | 1/2001 | Welch ...................... 342/357.13 |
| 6,386,882 B1 | 5/2002 | Linberg |
| 6,418,346 B1 | 7/2002 | Nelson et al. |
| 6,564,103 B2 | 5/2003 | Fischer et al. |
| 6,711,442 B1 | 3/2004 | Swerdlow et al. |
| 6,850,150 B1* | 2/2005 | Ronkainen ................. 340/7.58 |
| 2004/0192423 A1 | 9/2004 | Nevermann |

OTHER PUBLICATIONS

Canadian Space Agency, CSA Sectors, "Operational Space Medicine—Projects Electrical Muscle Stimulation" http://www.space.gc.ca/asc/eng/csa_sectors/human_pre/cao/osm_ems.asp, Sep. 29, 2002.

Pro-Med Products—BioFeedback Pathway TR-10C EMG, Pathway MR-20 EMG, EMG Retrainer, EMG Retrainer IR, http://www.promedproducts.com/Merchant2/merchant.mv?screen=CTGY&Store_Code=PP&Category_Code=B1, Jul. 21, 2004.

* cited by examiner

*Primary Examiner*—Marceau Milord

(57) ABSTRACT

A system includes a wireless device (101) and at least one stimulator pad (400, 500). The stimulator pad (400, 500) has a set of electrodes (404) that are in communication with the wireless device (101). The stimulator pad (400, 500) is worn on the skin of a user. The wireless device (101) is operable to receive an incoming signal and to place an electric potential on the conductors (404) so that various areas of the user's body are stimulated and the user will receive notification of the incoming signal in a completely silent manner. The pad (400) can be either wired or wireless and can be used to deliver therapeutic body stimulation as well. In another embodiment, the wireless device (101) controls at least one stimulator pad (400, 500) independent of any incoming signal received.

23 Claims, 4 Drawing Sheets

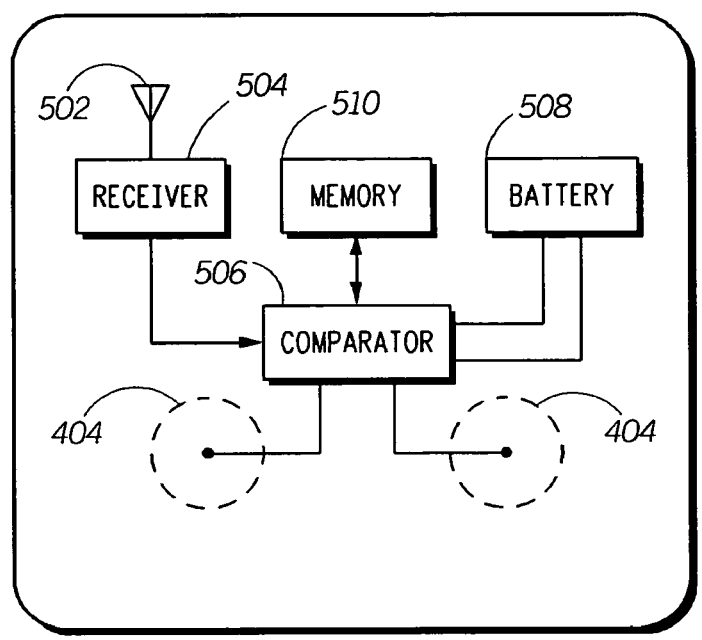
FIG. 5
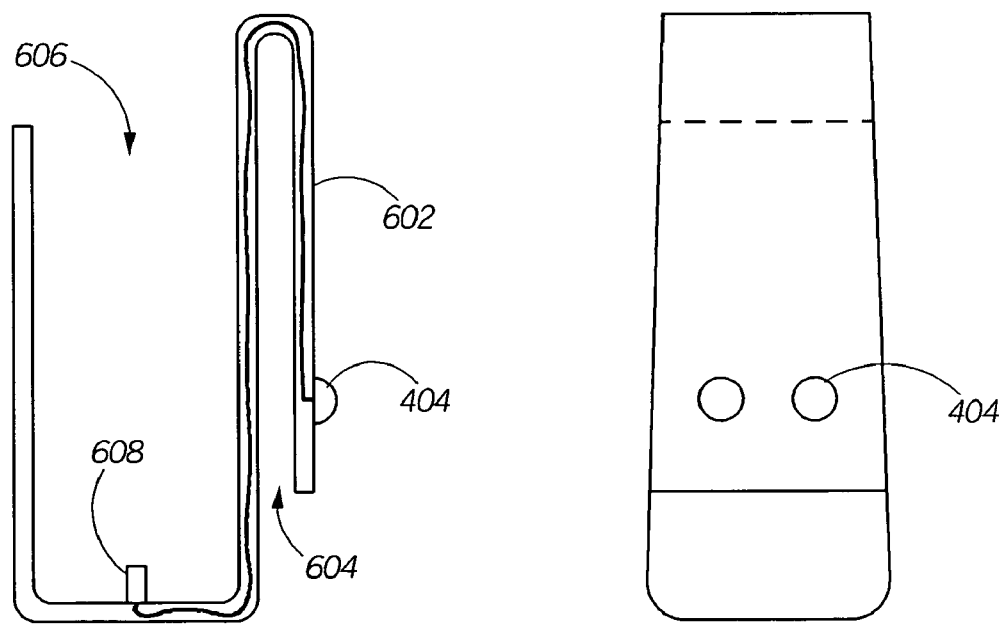
FIG. 6
FIG. 7

APPARATUS AND METHOD FOR STIMULATING ONE OR MORE AREAS ON A WEARER

BACKGROUND OF THE INVENTION

1. Field of the Invention

This invention relates in general to electrically stimulating areas of the body, and more particularly, to temporarily stimulating areas of the body including muscles for silent notification of an event and/or for therapeutic treatment.

2. Description of the Related Art

Wireless communication devices, such as cellular telephones, are well known in the art. Other devices, such as pagers, PDA's, palmtops, laptops, and others, are also well known in the art, and, similar to cellular telephones, can be provided with receivers for wirelessly receiving information.

When an originator of a message, whether voice, data or a combination thereof, wishes to communicate the message to a destination device, the originator utilizes an origination device to wirelessly transmit the information through the free space e.g. air, to the destination device. Upon receiving the information, the destination device has a variety of options on how to deal with the incoming information. If the device is configured to handle the reception, the device may automatically perform an operation with the information, for instance save it to a memory within the destination device. The device can be also configured to alert a user that an incoming message has arrived, for example in a simple example, a telephone ring.

The alert functionality of a wireless device is currently offered in several modes, such as an audible alert, an audible alert with varying volume, an illuminating alert, a visual display alert, a vibrating alert, and more. Each of the previously listed alert modes can be selected to best fit the environment that the user is in. For instance, when a user is outdoors, the user may wish to have the device set to the loudest audible alert so it can be head it over other competing noises. When indoors, where the environment may be quieter than outdoors, the user may wish to set an audible alert to a lower level. In a movie theater, for instance, where a user cannot answer the incoming call or deal with the incoming data, the user may set the alert mode to a silent alert, such as a flashing light. However, unless the user is in visual communication with the device, the user will not see the flashing light.

Prior art designs have tried to silently notify a wearer of an incoming communication by providing a vibrating alert, which produces a vibration, or shaking motion within the device. However, the vibrating alert many times produces an audible sound, especially when the wireless device is left on a surface such as a table top. The vibration on such a surface can be easily detected in quiet environments such as business meetings. This vibration is often times unintentionally distracting to others.

Accordingly, a need exists for a notifier that alerts a user to an incoming message or data without producing an audible sound and without requiring the user to visually check for the message.

SUMMARY OF THE INVENTION

Briefly, in accordance with the present invention disclosed is a wireless communication device that silently alerts a user of an incoming message or data. The wireless device includes a receiver that wirelessly receives signals, a processor that handles the received signals according to instructions, a memory that stores the instructions, a power supply, and an output. The present invention also includes at least one set of electrodes that contact the epidermis or skin of a user. The use of electrodes to stimulate the body, especially areas of the epidermis and muscles under the epidermis is well known in the art. The electrodes are electrically conducting elements and in one embodiment of the present invention are attached to the output of the wireless device. Alternatively, the electrodes can be connected to the output of the wireless device without wires. As an additional alternative, the electrodes can be on a physical form that the wireless device attaches to via its output.

When the wearer/user receives an incoming call, message, or data delivery, an electric potential is placed across the electrodes and an electric field created by the electrodes physically stimulates the body, such as areas of the epidermis and muscles under the epidermis of the wearer, thereby alerting the wearer of the incoming call in a completely silent manner. The potential can be in the form of an alternating potential that produces an alternating current between the opposing electrodes. In another embodiment, the electrodes apply two alternating currents of slightly differing frequencies to the body of a user so that they cross and interact to produce a low frequency current at a selected point.

The stimuli can be delivered in a various power levels, frequencies, and duty cycles. Additionally, a plurality of electrode sets can be utilized and each electrode set can be individually addressed to stimulate the wearer at a particular time to communicate to the wearer information such as who is calling, or what data is being received by the wireless device.

Because muscle stimulation is known to have therapeutic effects, the wireless device can also be utilized to deliver muscle stimulation at a time and manner selected by the wearer and delivered to specific areas of the body. A stimulation pattern can be input to the wireless device and the pattern produced at a designated time by the wireless device.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 5 is a diagram illustrating a wireless stimulator pad in accordance with an embodiment of the present invention;

FIG. 6 is a diagram illustrating a side-view of a wireless device holder in accordance with an embodiment of the present invention;

FIG. 7 is a diagram illustrating a back view of the wireless device holder of FIG. 6 in accordance with an embodiment of the present invention;

DETAILED DESCRIPTION OF THE PREFERRED EMBODIMENT

Figure 1:
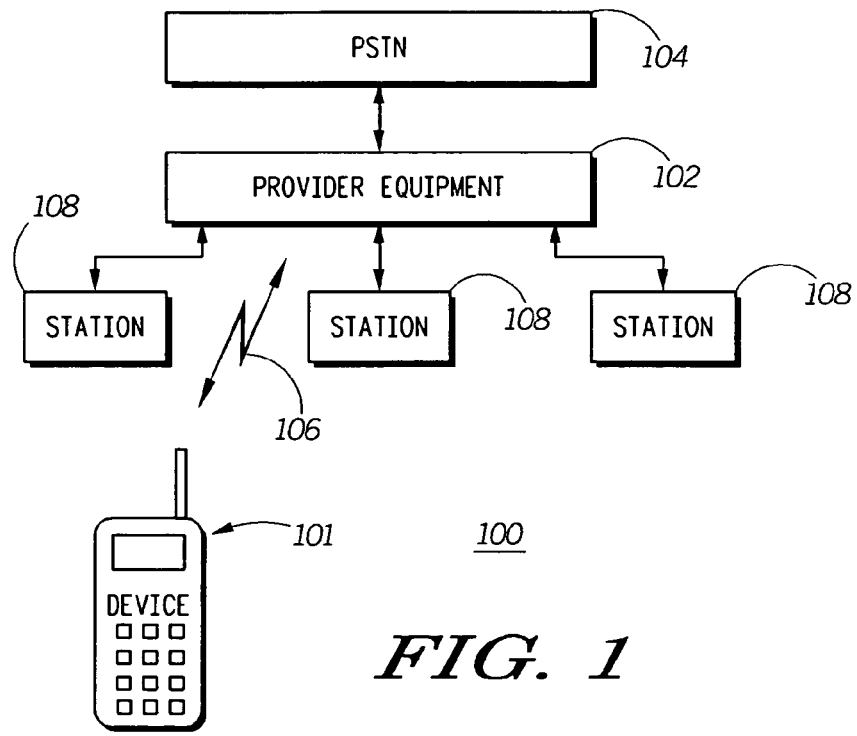
FIG. 1 is a block diagram illustrating a wireless system in accordance with an embodiment of the present invention.

While the specification concludes with claims defining the features of the invention that are regarded as novel, it is believed that the invention will be better understood from a consideration of the following description in conjunction with the drawing figures, in which like reference numerals are carried forward.

System

Described now is an exemplary hardware platform according to an exemplary embodiment of the present invention. FIG. 1 shows a block diagram of a radio communication system 100, in accordance with the present invention. The radio communication system 100 includes provider equipment 102, which is coupled to a public switched telephone network 104 and wireless device 101. The provider equipment 102 includes a communication channel 106, and base stations 108. The provider equipment 102 interfaces with the public switched telephone network 104 to provide a gateway for managing and routing messages to and from particular wired devices. These messages may be obtained from a source outside the radio communication system via the public switched telephone network 104, or may be sourced from an internally serviced wireless device or other equipment.

Figure 2:
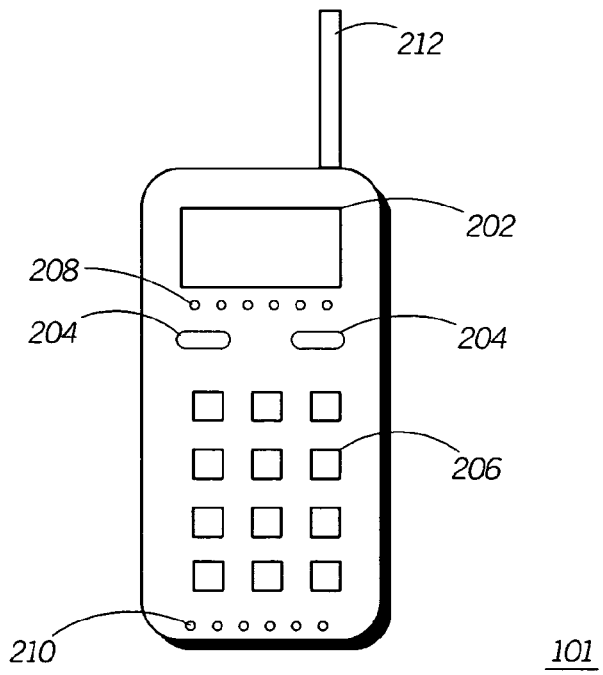
FIG. 2 is a block diagram illustrating a wireless device in accordance with an embodiment of the present invention.

The provider equipment 102 is able to provide direct communication between an originating wireless device and a target wireless device without accessing the public switched telephone network 104. The base stations 108 are coupled to the provider equipment 102 and are ordinarily geographically dispersed to service wireless devices in specific geographic regions. It is important to note, that wireless device 101 in another embodiment communicates with another wireless device 101 without assistance of a communication network Wireless Device Referring now to FIG. 2, the wireless device 101 is shown. The specific wireless device 101 depicted in FIG. 1 is a cellular telephone. As will be clear however, the present invention is not so limited and can also be other wireless devices including but not limited to PDA's, SmartPhones, Laptops, Pagers, Two-way Radios, and satellite phones. For clarity and ease of discussion a wireless telephone, its structures, and functions will be referred to throughout the remainder of the specification. A cellular telephone 101 includes a display 202 for viewing information and commands, command buttons 204 for controlling modes and commands of the device, buttons 206 for entering information and dialing numbers, a speaker 208 for broadcasting voice and messaging information and audible alerts, a microphone 210 for converting audible sounds to proportionate voltages, and an antenna 212 for wirelessly communicating with a remote sender or receiver (not shown).

The wireless device 101 interfaces with the provider equipment 102 via wireless communication link 106 established with the base stations 108. The wireless device 101 works in conjunction with the provider equipment 102 to provide a user with services such as telephone interconnect, short message service, dispatch or instant conferencing, circuit data, packet data, and combinations thereof, as well as other data services.

Figure 3:
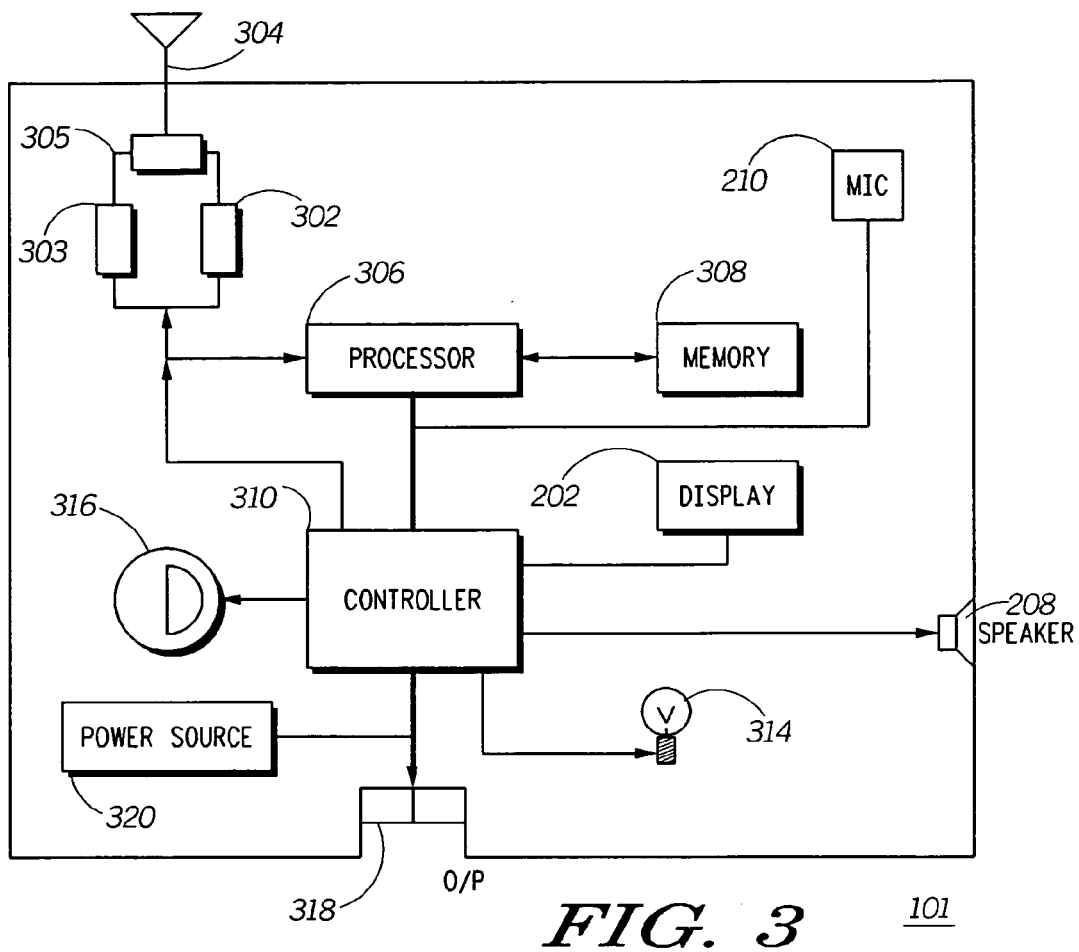
FIG. 3 is a schematic diagram illustrating the components of a wireless device in accordance with an embodiment of the present invention.

Referring now to FIG. 3, a block diagram of internal components of the wireless device 101 is shown. The device 101 includes a transmitter 303 and a receiver 302. The transmitter 303 and receiver 302 are coupled via an antenna switch 305 to an antenna 304. For transmit operations, the antenna switch 305 couples the transmitter 303 to the antenna 304. Similarly, for receive operations, the antenna switch 305 couples the antenna 304 to the receiver 302. The transmitter 303 and receiver 302 are coupled to a processor 306.

Processors are well known in the art. The processor 306 is able to execute program instructions stored in a memory 308 and to store data received from receiver 302 and antenna 304 in memory 308. Processor 306 is also coupled to a controller 310, which selects between notification modes in response to instructions provided from the processor 306. The notification modes shown in FIG. 3 are though a user interface which includes an audible alert by sending an audible signal to speaker 208; a visual alert by either sending a information to display 202 or a signal to light source 314; a physical stimulation created by turning off-balanced motor 316 at a relatively high rate of speed; or outputting a signal on output 318 or transmitter 303. Other notification modes not shown in FIG. 3 will work equally as well as those that are shown in FIG. 3 and can be used in further embodiments of the present invention to achieve the same or similar results. The wireless device 101 also includes a power source 320, such as a battery and set-up up transformer for applying a power to the stimulators pads as further described in the next section below.

The particular notification mode selected can be a function of the identification of the source of incoming message, including voice and/or data, can be a function of a selection made by a user of the wireless device 101, or any of several other possibilities. Additionally, the behavior/response of each mode to an incoming message by the particular alert can be personalized to each incoming message source by storing response data in memory 308, which is retrieved and executed by the processor 306 when an incoming message arrives. For example, a particular song can be played when the user's spouse calls him and a different song can be played when other callers, or unknown callers call the user's wireless phone 101. In other modes, such as vibration mode, the number of vibration pulses or duration between pulses can be varied to indicate the source of the incoming call.

It is to be noted that the above described notification modes requires the user to chose between a mode that is silent and will, therefore, require the user to remember to periodically visually check the device for an incoming call, or select a notification mode where incoming calls can be detected by others in close proximity to the user.

Stimulator Pads

Figure 4:
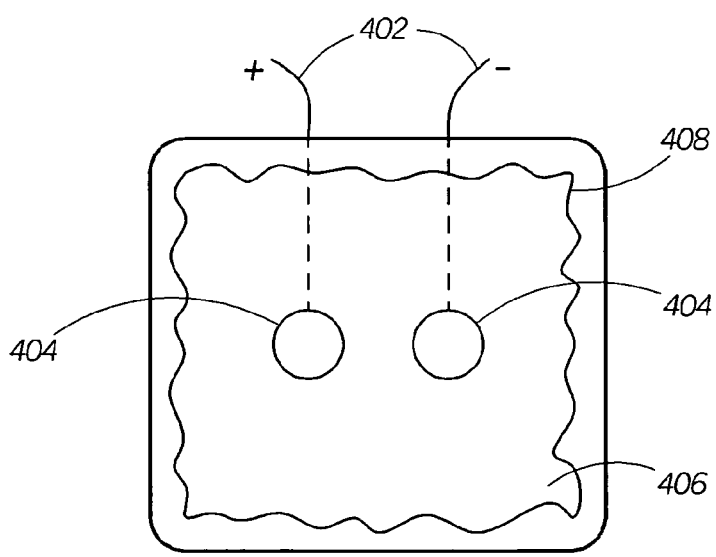
FIG. 4 is a diagram illustrating a stimulator pad in accordance with an embodiment of the present invention.

FIG. 4 shows a stimulator pad 400 in accordance with an embodiment of the present invention. Stimulator pad 400 is attachable to the wireless device 101 via leads 402, which include two electrically isolated conductive paths to a set of conductors 404 near the center of the pad material 406. The pad material 406 can be cloth, plastic, a synthetic material, a combination thereof, or several other material compositions. In a preferred embodiment, the conductors 404 are on an opposite side of pad material 406 than are the leads 402. The side of the material 406 with the conductors 404 is attachable to the skin of a wearer and in one embodiment secured in place with a layer of adhesive 408. Adhesive 408 can span the entire surface of the material 406, or be placed on only certain regions, such as the edge region as shown in FIG. 4. In accordance with another embodiment, a Velcro strap is used to hold the stimulator pad 400 in place (not shown).

The ends of leads 402 opposite the conductors 404 can be attached to output 318 on device 101, shown in FIG. 3. When the device 101 outputs a voltage on output 318, the voltage is applied to leads 402, which acts to create an electric potential across conductors 404 attached to the skin of a user. Although the conductivity of skin is low, a sufficient voltage will induce a current flow between the conductors 404 travelling through the skin of a wearer. Because muscles are located just beneath the skin, the current travels through the muscles as well and induces stimulation. Although the device 101 has a power source, such as a portable battery and step-up transformer, to provide power to stimulator pad 400, in another embodiment, the simulator pad may have a separate power source coupled to it to provide the necessary power across the electrodes. In this embodiment, the wireless device 101 does not supply power but rather only control signals to the stimulator pads 400 (or stimulator pads 500 described below). In an analogous method to setting ring-volume during notification, the strength and/or the pattern of the stimulations on the pads 400 (and 500 below) are manually set by the user of the wireless device.

The stimulator pad 400 may be operated in any of several modes, but in one embodiment is operated with alternating signals of differing frequencies of different voltages and currents being applied to the conductors 404. In one embodiment, muscle stimulation may be imposed by applying a fixed frequency difference between electrodes 404. In other embodiments, the frequency difference is periodically decreased, and then returned to the original frequency difference. In still other embodiments, the frequencies delivered to each electrode do not differ from each other at all. In practice, any method of applying an electrical voltage to the conductors 404 in a manner that will sufficiently stimulate the muscle of a user so that he or she is notified of an event, will satisfy a goal of the present invention. It is important to note that in another embodiment, more than one stimulator pad 400 (and stimulator pad 500) can be controlled by a single wireless device 101. In this embodiment, several stimulator pads are electrically coupled, wired or wirelessly, back to the wireless device 101. The wireless device 101 controls the stimulations of multiple pads at once. One wireless protocol which has been shown to be used advantageously with the present invention is the BlueTooth wireless protocol, but other wireless protocols may be used within the true scope and spirit of the present invention.

In still another wireless embodiment, in lieu of using a local wireless protocol such as Infra-red or short range radio, the wireless device 101 communicates wirelessly with the pads over the identical communication channel used to communicate voice and/or data over the wireless system of FIG. 1.

In some situations, it may be desirable for the pad 400 to not be attached to the device 101 with wires as shown in FIG. 4. For instance, a user may wish to leave the device in a remote location, loan the device to another person, simply not want to be encumbered with the wires traveling from the device to beneath his clothes, or one of many other reasons.

Shown in FIG. 5 is another embodiment of the pad 400. In the embodiment of FIG. 5, a stimulator pad 500 is wirelessly communicable with the device 101. Stimulator pad 500 includes an antenna 502 feeding a receiver 504, which is in turn fed to a comparator 506.

In another embodiment, the receive 504 is replaced with a transceiver (not shown). The transceiver permits acknowledgements and status to be sent from the wireless stimulators pads 500 back to the wireless device 101. The status sent are error checks in communications, stimulator pad 500 operation, battery status of the stimulators pads, and other status of the stimulator pads 500. The acknowledgments are important, especially in the embodiment where more than one stimulator pad 500 is used with a wireless device to ensure proper communications are received.

The comparator 506 compares a signal received from the receiver 504 to a memory 510 of identifiers and pulse patterns stored in memory 510, along with other information. If the received signal matches an identifier in the memory 510, the comparator then applies power from power source, such as battery 508 to conductors 404 in accordance with the stored pulse pattern assigned to the identifier to provide signal origination identification to the user. If the received signal does not match an identifier in the memory 510, a default pulse pattern can be applied to the conductors 404. In another embodiment, the calling device will send pulse pattern/identifier information to pad 500 at the time stimulation is requested.

In yet another embodiment, the comparator 506 is a general purpose embedded microcontroller which allows for a dynamically downloadable stimulus waveforms.

In the embodiment just described, one or more pads 500 (or in the alternative wired pads 400) can be placed at various locations on the body of a user without the encumbrance of wires connecting the phone. Additionally, because the pads are wireless receivers, the device 101 can be separated from the pad 500 by a distance that increases in proportion to the power of the transmitted signal and the sensitivity of the receiving circuit 502 and 504 within the pad 500, but could be a substantial amount. Another aspect of wireless pad 500 is that the pads can more easily be separated on the body than with wired pads 400.

As described above, the identification of a caller or the type of information being received can be communicated to the wearer of the pad 400, 500 by causing a pulse pattern to be followed when stimulating the muscle. The particular pulses placed on the pads 400, 500 become a signal origination identifier to the wearer of the pads 400, 500. The wireless pad 500, thereby provides a more easily identified caller identification stimulus pattern because the separation of multiple pads is facilitated by the absence of wires 402. Therefore, not only is the pulse pattern the signal origination identifier, but so to is the body part stimulated.

In yet another embodiment, shown in FIG. 6 is a diagram illustrating a side-view of a wireless device holder in accordance with the present invention. As shown in FIG. 6, the conductive contacts 404 are arranged on an outside surface 602 of a wireless device holder 600. The holder 600 has an attaching region 604 that is arranged so as to be able to slide onto and attach to an article of clothing (not shown), such as the waistline of a pair of pants. When the holder 600 is attached to the clothing, the conductors 404 make contact with the skin of the wearer.

The holder 600 has a cradle area 606 that can accept a wireless device 101. At the bottom of the cradle area 606 is a docking interface 608 that removably attaches to the output 318 on a bottom side of wireless device 101. The docking interface 608 places the electrical conductors 404 in electrical communication with the wireless device 101.

Therefore, when a call is received, or information is sent to the device 101, the device 101 can notify the wearer of the holder 600 of the incoming call or message by placing a signal across the conductors 404 and thereby stimulating an epidermal area of the wearer's body, resulting in a completely silent notification of the incoming call or message. FIG. 7 is a diagram 700 illustrating a back view of the wireless device holder of FIG. 6 in accordance with the present invention illustrating conductors 404.

Figure 8:
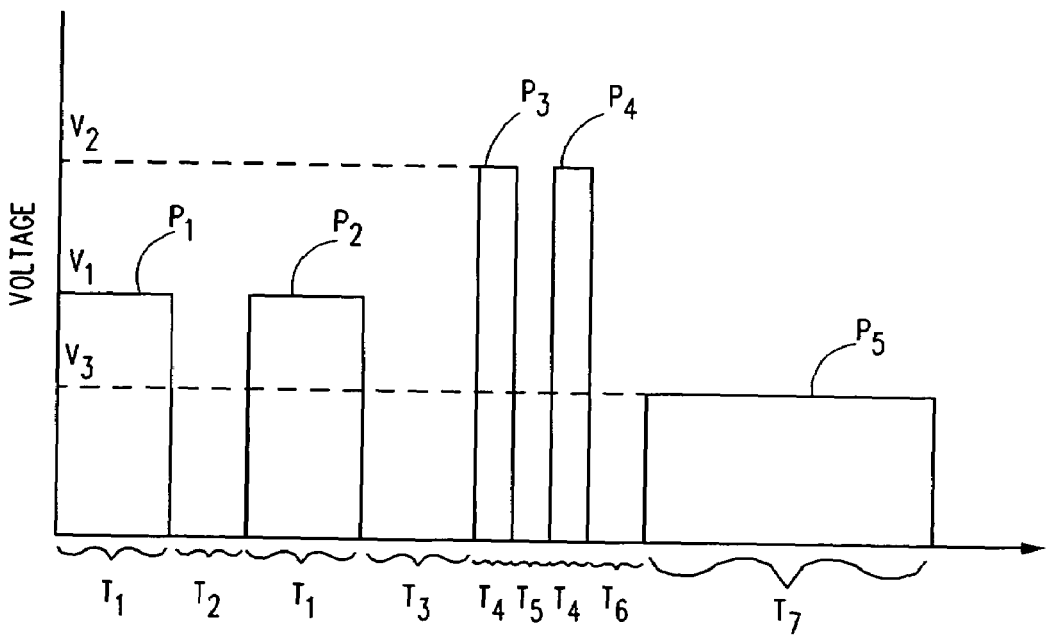
FIG. 8 is a diagram illustrating stimulator pulse variations in accordance with an embodiment of the present invention.

FIG. 8 shows a graphic illustration of a few ways in which the notification signal can be varied in accordance with the present invention. The vertical axis is in terms of increasing voltage (V) and the horizontal axis is in terms of increasing time (t). Starting on the left side of the graph is a first pulse $P_1$ with a maximum voltage of $V_1$ and period of $T_1$. After the period $T_1$, the voltage drops to zero for a period $T_2$. The next pulse $P_2$ has the same maximum voltage of $V_1$ and the same period $T_1$. A longer series of pulses of the same period and voltage as $P_1$ or $P_2$ would produce a steady pulsing wave of stimulus for the wearer.

Pulses $P_3$ and $P_4$ are shown in FIG. 8 and have a larger maximum voltage $V_2$ and shorter period $T_4$. Pulses $P_3$ and $P_4$ may produce a stronger stimulus to the user but for a shorter amount of time. Because the period $T_4$ is shorter, pulses $P_3$ and $P_4$ do not use any more power than do pulses $P_1$ and $P_2$, but will cause the user to notice a difference between the two pulses because they have a higher frequency $T_5$ and a larger amplitude $V_2$.

A third pulse $P_5$ is also shown in FIG. 8. Pulse $P_5$ has a lower amplitude, $V_3$, and a longer period, $T_7$. Pulse $P_5$ may feel to the user as one long pulse as opposed to individual pulses as in $P_1$ and $P_2$ or $P_3$ and $P_4$. Because the amplitude $V_3$ of pulse $P_5$ is lower than the other shown pulses, but the period $T_7$ is longer, pulse $P_5$ uses no more power than do the other pulses.

The above described exemplary pulses are for clarification only and as will to known to those of ordinary skill in the art, many other pulses of varying amplitude and period can be used equally as well in the present invention to identify the source of a call or type of incoming message.

In addition to event notification, electric muscle stimulators have been shown be useful in reducing pain and inflammation, increasing blood flow, and reducing muscle spasms within the body. The stimulator pads 400, 500 of the present invention can, in addition to the uses stated above for notification, be used for therapeutic stimulation of the various epidermal and subcutaneous areas of the wearer's body. As described above a large variety of stimulus patterns are possible. The stimulus patterns can be manually programmed into the device 101 by the user, selected from a programmed list of patterns in the device 101 or, alternatively, can be downloaded to the device 101 from, for example, a doctor's website or in-office computer by a therapist. In this way, the patterns that provide the most therapeutic benefits can be provided to the user.

Figure 9:
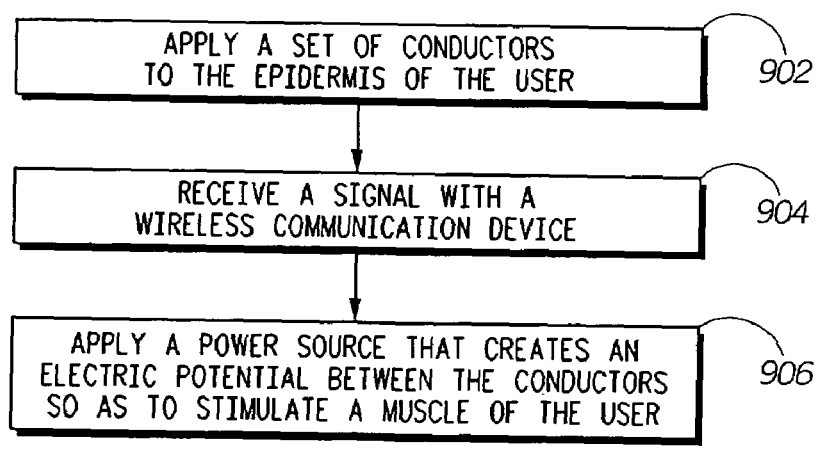
FIG. 9 is a flow diagram illustrating the process of in accordance with an embodiment of the present invention.

FIG. 9 shows the process of the present invention. In step 902, a set of conductors is applied to the epidermis of a user of the device 101. Next, in step 904, the device 101 receives a signal, which could be an incoming call, data, information, or other transmissions. As a response to the incoming signal, the device 101, in step 906 applies a power source to the conductors that creates an electric potential between the conductors so as to stimulate an epidermal area on the user's body. The user is then notified of the received signal by the device 101.

Although the present invention has been shown and described as being used by a wearer, it is important to note, that other applications, such as for training or therapeutic purposes on animals is within the true scope and spirit of the present invention.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An apparatus for stimulating areas of a body comprising:
   a wireless communication device that alerts a user of an incoming message through a user interface;
   at least one set of conductors coupled to the wireless device, the conductors including a first conductor and a second conductor that are arranged so as to contact an epidermal area of a body of a wearer of the apparatus; and
   a power source for creating an electric potential between the first conductor and the second conductor under control of the wireless communication device, wherein the electric potential induces a current flow between the first conductor and the second conductor and the current travels through the epidermal area of the body of the wearer of the apparatus.

2. The apparatus according to claim 1, wherein the at least one set of conductors comprises:
   a receiver for wirelessly receiving a control signal from the wireless communication device.

3. The apparatus according to claim 1, further comprising:
   a wireless device holder that removably holds the wireless communication device, the wireless device holder including:
   a wireless device holder body; and
   a docking interface on the wireless device holder body connecting an output of the wireless communication device to the at least one set of conductors.

4. The apparatus according to claim 3, wherein the at least one set of conductors are disposed on an outside of the wireless device holder and make contact with the epidermal area of the body when the wireless device holder is disposed against the body.

5. The apparatus according to claim 1, wherein the electrical potential is applied in pulses.

6. The apparatus according to claim 5, wherein the pulses vary in current, width, amplitude, or frequency.

7. The apparatus according to claim 6, further comprising:
   a memory for holding at least one identifier corresponding to pulse patterns.

8. The apparatus according to claim 1, wherein each set of conductors is independently addressable by the wireless device for control thereof.

9. The apparatus accordingly to claim 1, wherein at least one set of conductors is coupled to a power source independent of the wireless device.

10. The apparatus according to claim 1, wherein the electrical potential created across at least one set of conductors is sufficient to be detectable by the body as a notification.

11. The apparatus according to claim 10, further comprising:
    a memory that stores a plurality of stimulus patterns.

12. The apparatus according to claim 11, further comprising:
a user interface that selectively chooses one of the stimulus patterns.

13. The apparatus according to claim 11, further comprising:
a processor; and
a software application that is run by the processor and causes at least one of the plurality of stimulus patterns to be followed.

14. The apparatus according to claim 1, wherein the electrical potential created across at least one set of conductors is sufficient to stimulate at least part of the epidermal area of the body.

15. A method for stimulating areas of a body, the method comprising:
applying to an epidermal area of a body at least one set of conductors, each set including a first conductor and a second conductor; and
transmitting a signal from a wireless communication device that alerts a user of an incoming message through a user interface to at least one of the set of conductors, whereby the signal controls an electric potential between the first conductor and the second conductor of the at least one set of conductors and the electric potential induces a current flow between the first conductor and the second conductor and the current travels through the epidermal area of the body.

16. The method of according to claim 15, wherein the method further comprises:
transmitting a silent alert signal to the at least one set of conductors from the wireless communication device.

17. The method according to claim 15, further comprising:
applying the electric potential in pulses that vary in current, width, amplitude, or frequency.

18. The method according to claim 15, further comprising:
searching a memory for at least one identifiers and corresponding preselected electric potential pulse patterns; and
applying the preselected electric potential pulse pattern to the at least one set of conductors.

19. The method according to claim 15, wherein each of the at least one set of conductors is individually addressable and the method further comprises:
searching a memory for at least one identifiers and corresponding preselected electric potential pulse patterns; and
applying the preselected electric potential pulse pattern to the individually addressable at least one set of conductors.

20. The method according to claim 15, wherein the electric potential further comprises:
an alternating polarity on each of the conductors.

21. A simulator pad for applying stimulus to an epidermal area of a body, the pad comprising:
at least one set of conductors, each set including a first conductor and a second conductor adapted to apply an electric potential to an epidermal area of a body of a wearer of the simulator pad; and
an interface for receiving a signal from a wireless device with a user interface for alerting a user of an incoming message, whereby the signal controls the electric potential between the first conductor and the second conductor and the electric potential induces a current flow between the first conductor and the second conductor and the current travels through the epidermal area of the body of the wearer of the simulator pad.

22. The stimulator pad according to claim 21, wherein the alerting a user of the incoming message is associated with the signal for controlling the electrical potential.

23. The stimulator pad according to claim 22, wherein the alerting a user of the incoming message includes alerting the user with a silent alert.

* * * * *